United States Patent
Houlihan et al.

(10) Patent No.: US 10,457,403 B2
(45) Date of Patent: Oct. 29, 2019

(54) DUAL-CHANNEL DEICING SYSTEM FOR A ROTARY WING AIRCRAFT

(71) Applicant: Sikorsky Aircraft Coporation, Stratford, CT (US)

(72) Inventors: Michael Houlihan, Southbury, CT (US); Robert J. Flemming, Jr., Trumbull, CT (US); Antonio G. Daniele, Manchester, CT (US); Timothy R. Budd, Trumbull, CT (US); Mark P. Eisenhauer, Milford, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 0 days.

(21) Appl. No.: 15/694,088

(22) Filed: Sep. 1, 2017

(65) Prior Publication Data
US 2018/0037328 A1   Feb. 8, 2018

Related U.S. Application Data

(62) Division of application No. 14/017,471, filed on Sep. 4, 2013, now abandoned, which is a division of application No. 11/101,269, filed on Apr. 6, 2005, now Pat. No. 8,550,402.

(51) Int. Cl.
| B64D 15/12 | (2006.01) |
| B64D 15/14 | (2006.01) |
| B64D 15/22 | (2006.01) |
| H05B 1/02  | (2006.01) |
| B64C 27/04 | (2006.01) |

(52) U.S. Cl.
CPC ............ B64D 15/12 (2013.01); B64D 15/14 (2013.01); B64D 15/22 (2013.01); H05B 1/0236 (2013.01); B64C 27/04 (2013.01)

(58) Field of Classification Search
CPC ........ B64D 15/12; B64D 15/14; B64D 15/22; H05B 1/0236
See application file for complete search history.

(56) References Cited

U.S. PATENT DOCUMENTS

| 2,429,061 A | 10/1947 | Hunter |
| 2,444,557 A | 7/1948 | Eaton |
| 2,491,172 A | 12/1949 | Forsyth |
| 2,625,661 A | 1/1953 | Haydon |

(Continued)

FOREIGN PATENT DOCUMENTS

| FR | 863490 | 4/1941 |
| FR | 2281273 | 3/1976 |

OTHER PUBLICATIONS

PCT International Search Report and Written Opinion, dated Jun. 26, 2008.

(Continued)

*Primary Examiner* — Michael H Wang
(74) *Attorney, Agent, or Firm* — Cantor Colburn LLP

(57) ABSTRACT

A dual primary deicing system for a rotary-wing aircraft, according to an exemplary aspect of the present disclosure includes, among other things, an electrothermal heating element system; and a controller in communication with said electrothermal heating element, said controller communicating a heating cycle to said electrothermal heating element system, said heating cycle defining a first electric pulse train associated with a main rotor blade assembly.

18 Claims, 7 Drawing Sheets

(56) References Cited

U.S. PATENT DOCUMENTS

| | | | |
|---|---|---|---|
| 2,638,295 A | 5/1953 | Sheets | |
| 2,678,181 A | 5/1954 | Geyer et al. | |
| 3,002,718 A * | 10/1961 | Hackenberger, Jr. | B64D 15/12 244/134 R |
| 3,013,752 A * | 12/1961 | Rush | B64D 15/12 219/549 |
| 3,183,975 A | 5/1965 | Keen | |
| 3,204,084 A * | 8/1965 | Spencer, Jr. | B64D 15/12 219/202 |
| 3,420,476 A | 1/1969 | Volkner et al. | |
| 3,496,331 A | 2/1970 | Fleury et al. | |
| 3,657,514 A | 4/1972 | Adams | |
| 4,036,457 A * | 7/1977 | Volkner | B64D 15/14 219/202 |
| 4,131,250 A | 12/1978 | Binckley | |
| 4,292,502 A * | 9/1981 | Adams | B64D 15/12 219/202 |
| 4,386,749 A | 6/1983 | Sweet et al. | |
| 4,410,794 A * | 10/1983 | Williams | B64D 15/14 219/201 |
| 4,467,490 A | 8/1984 | Adams | |
| 5,475,204 A | 12/1995 | Giamati et al. | |
| 5,610,845 A | 3/1997 | Slabinski et al. | |
| 5,657,951 A * | 8/1997 | Giamati | B64D 15/14 219/121.66 |
| 5,704,567 A | 1/1998 | Maglieri | |
| 5,947,418 A | 9/1999 | Bessiere et al. | |
| 6,129,314 A * | 10/2000 | Giamati | B64D 15/00 244/134 A |
| 6,181,235 B1 | 1/2001 | Smith | |
| 6,194,685 B1 * | 2/2001 | Rutherford | B64D 15/14 219/201 |
| 6,227,492 B1 | 5/2001 | Schellhase et al. | |
| 6,237,874 B1 * | 5/2001 | Rutherford | B64D 15/14 244/134 D |
| 6,279,856 B1 * | 8/2001 | Rutherford | B64D 15/14 244/134 D |
| 6,338,455 B1 * | 1/2002 | Rauch | B64D 15/12 244/134 D |
| 6,430,996 B1 | 8/2002 | Anderson et al. | |
| 6,462,703 B2 * | 10/2002 | Hedrick | G01C 5/005 340/977 |
| 6,503,056 B2 | 1/2003 | Eccles et al. | |
| 6,847,903 B2 | 1/2005 | Severson et al. | |
| 7,523,889 B2 * | 4/2009 | Bourjac | B64D 15/12 244/134 D |
| 7,556,221 B2 * | 7/2009 | Hindel | B64D 15/12 219/202 |
| 7,604,202 B2 * | 10/2009 | Froman | B64D 15/12 244/134 D |
| 7,922,120 B2 * | 4/2011 | Kumar | B64D 15/14 244/134 D |
| 8,550,402 B2 * | 10/2013 | Houlihan | B64D 15/14 244/134 D |
| 10,294,925 B2 * | 5/2019 | Klein | F03D 80/40 |
| 2004/0107027 A1 * | 6/2004 | Boudrieau | B64D 45/0015 701/1 |
| 2007/0075188 A1 * | 4/2007 | Stoner | B64D 15/14 244/134 D |
| 2007/0102582 A1 * | 5/2007 | Botura | B64D 15/14 244/134 D |
| 2007/0194179 A1 * | 8/2007 | Giamati | B64C 9/24 244/134 D |
| 2013/0270253 A1 * | 10/2013 | Botura | B64D 15/12 219/475 |

OTHER PUBLICATIONS

Extended European Search Report for European Patent Application No. 06749001.1 dated Mar. 20, 2013.

* cited by examiner

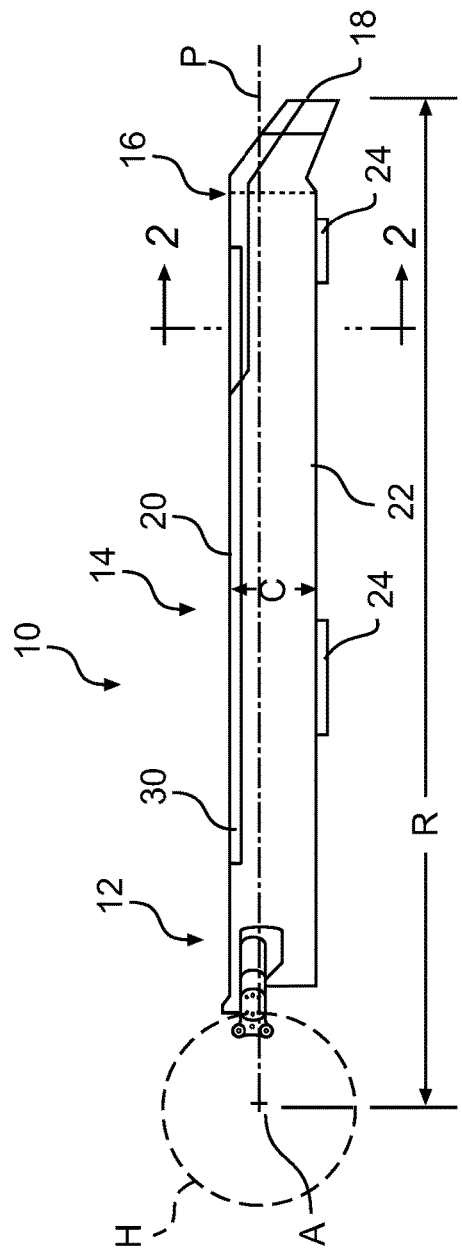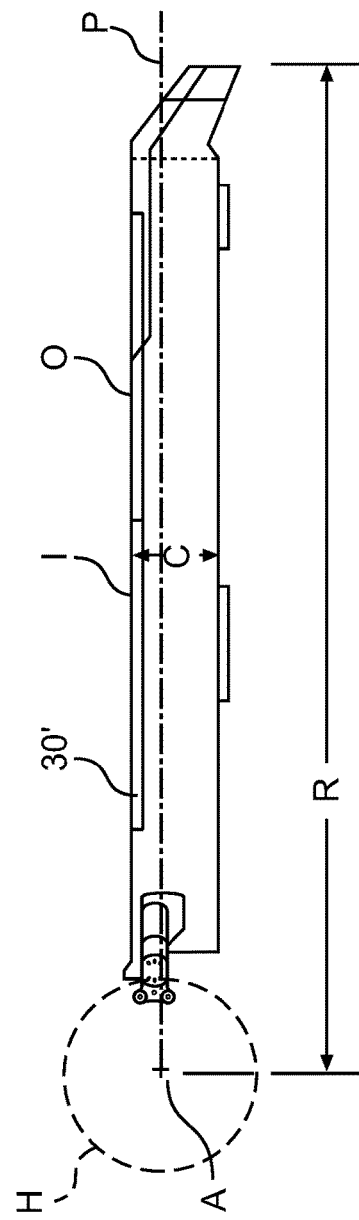
FIG. 2A
FIG. 2B

DUAL-CHANNEL DEICING SYSTEM FOR A ROTARY WING AIRCRAFT

CROSS-REFERENCE TO RELATED APPLICATIONS

This application is a divisional of U.S. patent application Ser. No. 14/017,471, which was filed on 4 Sep. 2013 and is incorporated herein by reference. U.S. patent application Ser. No. 14/017,471 is a divisional of U.S. Pat. No. 8,550,402, which was filed on 6 Apr. 2005 and is also incorporated herein by reference.

BACKGROUND

The present invention relates to an aircraft deicing system, and more particularly to a dual primary deicing system for a rotor system of a rotary-wing aircraft.

Rotary-wing aircraft may encounter atmospheric conditions that cause the formation of ice on rotor blades and other surfaces of the aircraft. Accumulated ice, if not removed, can add weight to the aircraft and may alter the airfoil configuration causing undesirable flying characteristics.

One approach to ice management that has been used is thermal deicing. In thermal deicing, the leading edge portions of the rotor blades are heated to loosen accumulated ice. The loosened ice is then removed from the structural members by centrifugal forces and the airstream passing over the leading edge.

In one form of thermal deicing, heating is accomplished by electrothermal heating elements over or within the leading edges of the airfoils. Electrical energy for the electrothermal heating elements is derived from a generating source driven by one or more of the aircraft engines or transmissions. The electrical energy is intermittently supplied to provide heat sufficient to loosen accumulating ice.

Rotary wing aircraft rotor blades are particularly susceptible to icing and provide numerous challenges for electrothermal deicing systems. One difficulty relates to the refreezing of ice, which is melted with a leading edge electrothermal element as the rotor system is constantly in motion.

FAA Regulations, including 14 CFR 29.1309, and SAE ARP4761 delineate increased flight safety and redundancy requirements for rotary-wing aircraft flying under icing conditions. Various functionally acceptable rotary wing deicing systems are currently in use, however, none provide the capabilities and redundancy necessary to meet the expanded FAA regulations. Deicing systems that meet these regulations provides a competitive position over currently available rotary-wing ice protection systems.

Accordingly, it is desirable to provide an effective, reliable, and redundant rotary wing deicing system which meets FAA Regulations.

SUMMARY

A deicing system according to the present invention includes a dual primary rotor deice system. Each major function of the system of the dual deice system includes redundant components. Each half of the dual system generally includes a controller, an air data computer, slip ring channels, power distributor components, an ice rate controller, and an ice rate probe. The controller communicates with a junction box which communicates the electrical energy to drive an electrothermal heating element system for the main rotor system and an antitorque rotor system. Each component of each of two subsystems of the dual deicing system can take over the function of a failed component in the other half of the dual deicing system.

The main rotor electrothermal heating element system includes a number of electrothermal heating elements on each rotor blade. The first electrothermal heating element of a spanwise rotor blade deice system is located along the leading edge of the main rotor blade along a stagnation line. The second electrothermal heating element is located aft of the first electrothermal heating element along the upper surface of the main rotor blade. The third electrothermal heating element is located aft of the first electrothermal heating element along a lower surface of the main rotor blade. The fourth and succeeding electrothermal heating elements are located aft of the third electrothermal heating element along the lower surface of the main rotor blade. The first electrothermal heating element of a chordwise rotor blade deice system is located near the tip of the rotor blade and additional elements are located inboard of this heating element. Those skilled in the art know that combinations of spanwise and chordwise heaters are practical.

The controller communicating a heating cycle to an electrothermal heating element system such that the electrical energy provided by the junction box follows the heating cycle. The heating cycle defines a first electric pulse train and additional electric pulse train subsequent to the first electric pulse train. The first electric pulse train may be associated with a first set of main rotor blades such as blades 1 and 3 of a four-bladed main rotor system, while the second electric pulse train is associated with a second set of main rotor blades such as blades 2 and 4 of a four-bladed main rotor system. A tail rotor blade distributor is typically not required as power is applied to each of the tail rotor blades simultaneously.

Each electric pulse train of a four-bladed, four-heating-element main rotor sequentially provides power to the heating elements in the designated blade set. The sequential order being the third electrothermal heating element, the first electrothermal heating element, the second electrothermal heating element, then the fourth electrothermal heating element. Such sequence efficiently minimizes the likelihood of the melted ice refreezing as it flows along the blade chord. The dual deicing system controller is trained to bypass a failed heating element, retaining the function of the remaining heater elements.

Each electric pulse train is defined by an element on-time, a null time between the element on-time for this element and the next element, and an off-time between repetition of the heating of this element. The element on-time is a function of outside air temperature (OAT). The off-time is a function of liquid water content (LWC). The tail rotor heating cycle is a more straightforward version of the main rotor heating cycle as each of the tail rotor blade heater elements are activated simultaneously and there is only a single heating element on each tail rotor blade.

DESCRIPTION OF THE DRAWINGS

The various features and advantages of this invention will become apparent to those skilled in the art from the following detailed description of the currently preferred embodiment. The drawings that accompany the detailed description can be briefly described as follows:

FIG. 2A is a plan view of a rotor blade for use with the present invention;

FIG. 2B is a plan view of a rotor blade with a spanwise zoned deicing system;

DETAILED DESCRIPTION

Figure 1:
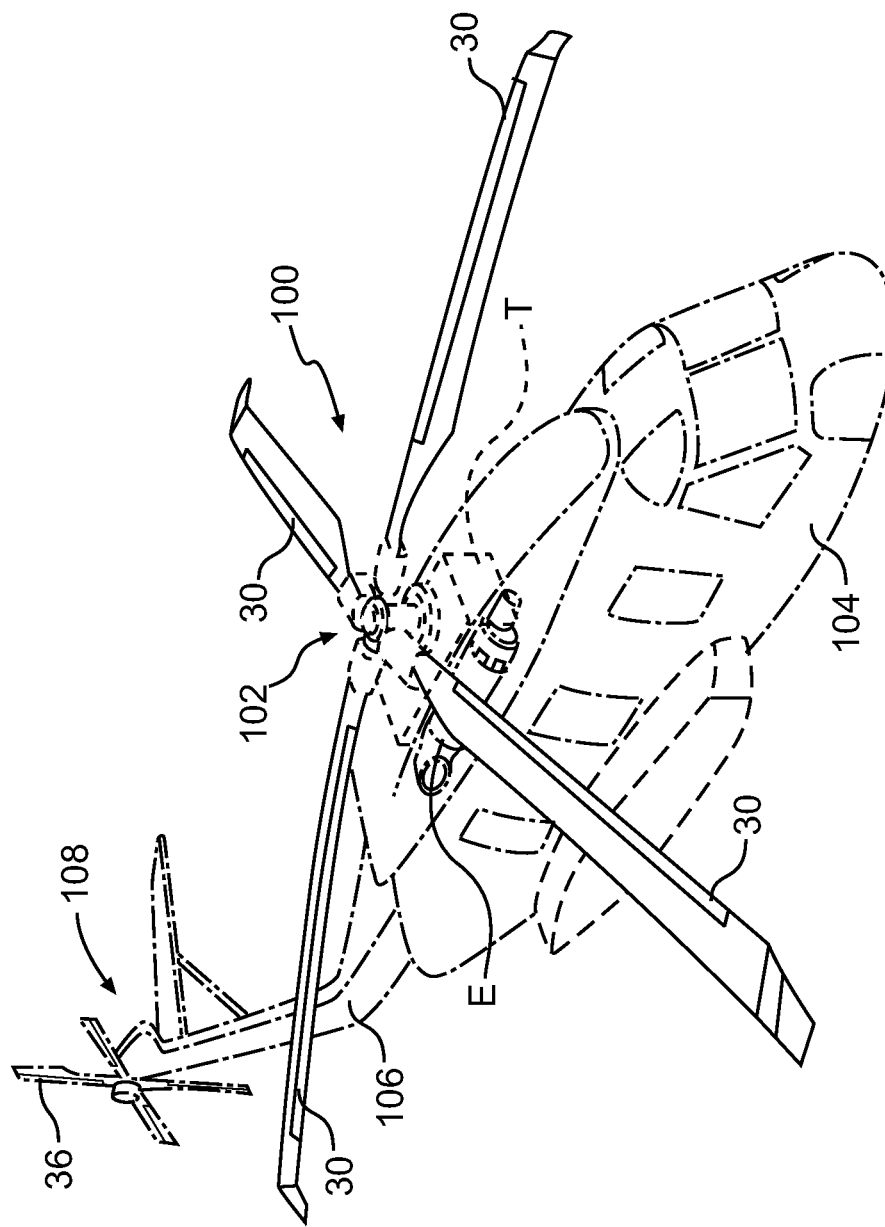
FIG. 1 is a general perspective view an exemplary rotary wing aircraft embodiment for use with the present invention.

FIG. 1 schematically illustrates a rotary-wing aircraft 100 having a main rotor system 102 with rotor blade heater elements 30. The aircraft 100 includes an airframe 104 having an extending tail 106 on which mounts an antitorque tail rotor system 108. The main rotor assembly 102 is driven through a transmission (illustrated schematically at T) by one or more engines E. Although a particular helicopter configuration is illustrated in the disclosed embodiment, other machines such as turbo-props, tilt-rotor, and tilt-wing aircraft will also benefit from the present invention.

FIG. 2 schematically illustrates an exemplary main rotor blade assembly 10 mounted to a rotor hub assembly H (illustrated schematically) of the main rotor assembly 102 for rotation about an axis of rotation A. The main rotor blade assembly 10 includes an inboard section 12, an intermediate section 14, and an outboard section 16. The inboard, intermediate, and outboard sections 12, 14, 16 define the span of the main rotor blade 10. The blade sections 12, 14, 16 define a blade radius R between the axis of rotation A and a blade tip 18.

A plurality of main rotor blade assemblies 10 project substantially radially outward from the hub assembly H and are supported therefrom in one of numerous attachments. Any number of blades 10 may be used with the main rotor system 102. The main rotor blade 10 has a leading edge 20 and a trailing edge 22, which define the chord C of the main rotor blade 10. Adjustable trim tabs 24 extend rearwardly from the trailing edge 22 or may be integral to the trailing edge 22. A pitching axis P is near the center of mass of the rotor blade in the chordwise direction and is also the axis about which blade 10 twist occurs. The airfoil surface of the rotor blade 10 is typically twisted linearly along the blade span to improve aerodynamic efficiency.

Figure 3:
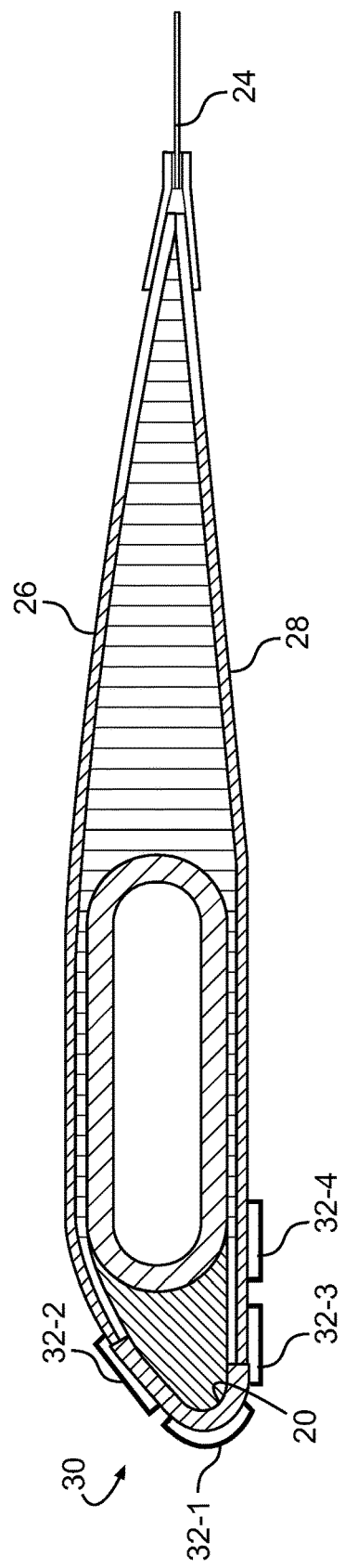
FIG. 3 is a sectional view of the rotor blade taken along line 2-2 of FIG. 2.

Referring to FIG. 3, upper and lower skins 26, 28 define the upper and lower aerodynamic surfaces of the main rotor blade 10. It should be understood that relative positional terms such as "forward," "aft," "upper," "lower," "above," "below," and the like are with reference to the normal operational attitude of the vehicle and should not be considered otherwise limiting. The skins 26, 28 are preferably formed from several plies of composite material such as woven fiberglass material embedded in a suitable resin matrix. An electrothermal heating element system 30 having a multiple of electrothermal heating elements 32 is located along the leading edge 20 of each rotor blade 10. During flight, airflow impinges the leading edge 20 and a continuum of stagnation points develop, forming a stagnation line or axis (illustrated schematically in FIG. 4).

Figure 4:
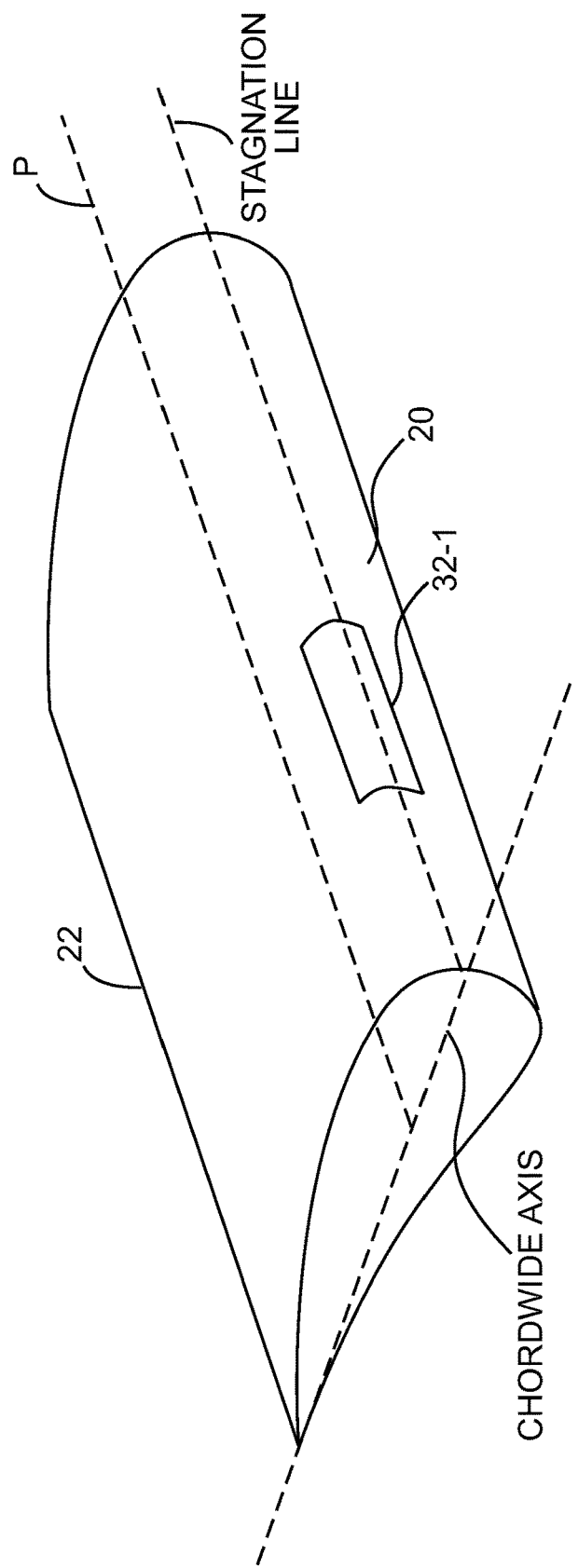
FIG. 4 is a perspective view of a rotor blade illustrating a stagnation line.

The electrothermal heating element system 30 preferably includes four or more spanwise electrothermal heating elements 32-1, 32-2, 32-3 and 32-4 (FIG. 2) which are distributed chordwise, or four or more chordwise electrothermal heating elements which are distributed spanwise. In a spanwise deice system with four heating elements per main rotor blade 10, the first electrothermal heating element 32-1 is located along the leading edge 20 of the main rotor blade 10 and preferably covering the stagnation line (FIG. 4). The second electrothermal heating element 32-2 is located aft of the first electrothermal heating element 32-1 along the upper surface 26 of the main rotor blade 10. The third electrothermal heating element 32-3 is located aft of the first electrothermal heating element 32-1 along a lower surface 28 of the main rotor blade 10. The fourth electrothermal heating element 32-4 is located aft of the third electrothermal heating element 32-3 along the lower surface 28 of the main rotor blade 10. Alternatively or in addition, the spanwise electrothermal heating elements 32-1, 32-2, 32-3 and 32-4 are separated into a multitude of spanwise zones such as an inboard zone I and an outboard zone O (illustrated schematically in FIG. 2B) to provide a composite spanwise and chordwise electrothermal heating element system 30'.

The chordwise heater element coverage is preferably from 8.6% of the upper surface to 15% of the lower surface for the SC2110 airfoil and from 8% of the upper surface 15% of the lower surface for the SSC-A09 airfoil. It should be understood that other airfoils will benefit from other chordwise coverage areas but Applicant has determined that from approximately these values to 10% of the upper surface to approximately these values to 17% of the lower surface is relatively effective for most airfoils. Spanwise the heating elements 32-1, 32-2, 32-3, 32-4 preferably cover from a 20% blade radius position to a 92% blade radius position of said main rotor blade span, although other values of spanwise coverage may be effective for other main rotor blades.

Each tail rotor blade 34 of the antitorque tail rotor system 108 preferably includes a single electrothermal heating element 36 which provides chordwise coverage from approximately 12% of the upper surface to 12% of the lower surface. Spanwise, the heating elements 36 preferably cover from a 25% blade radius position to a 92% blade radius position of the tail rotor blade span (FIG. 5).

Figure 5:
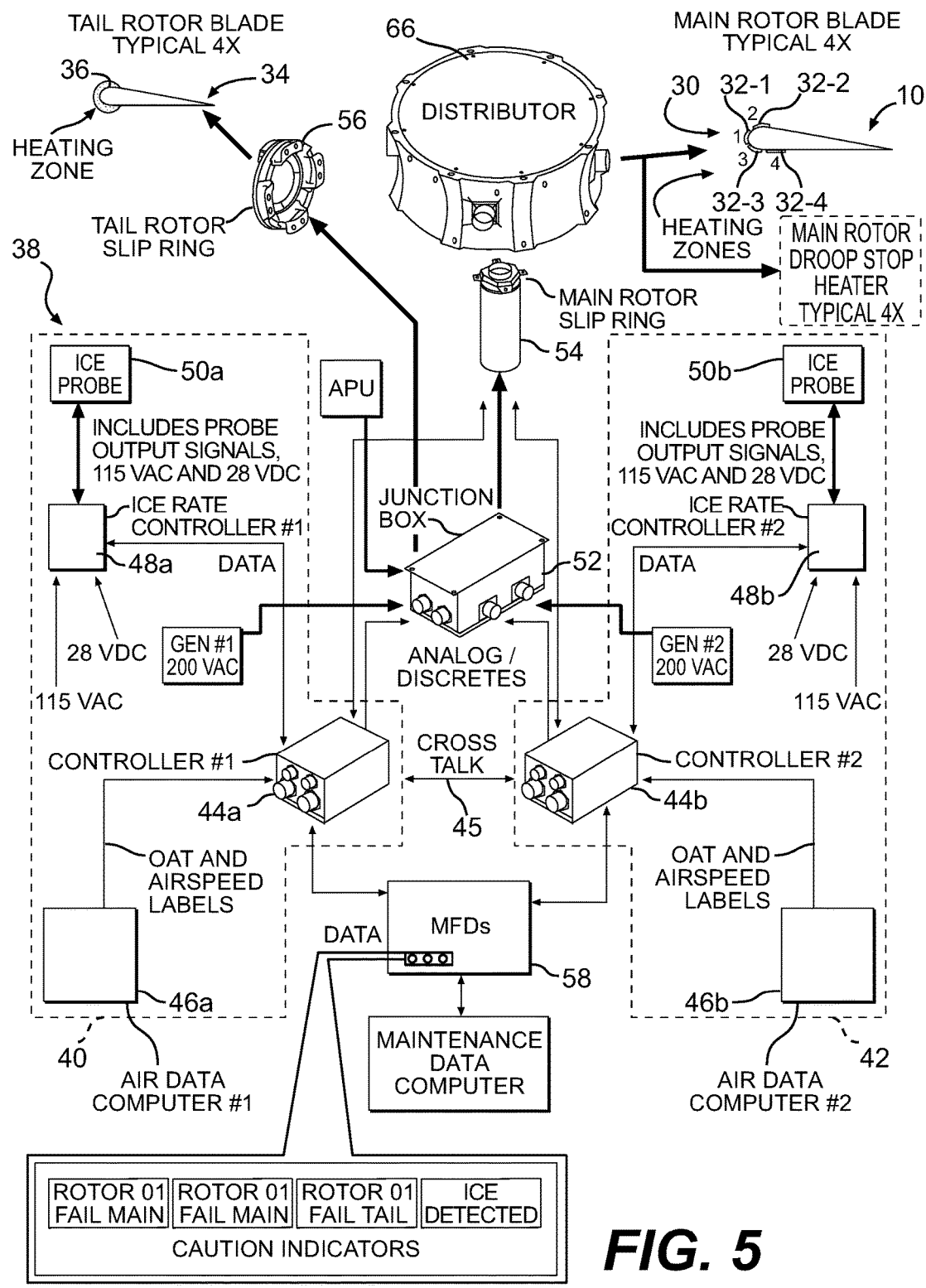
FIG. 5 is a schematic block diagram of a deice system.

Referring to FIG. 5, a deicing system 38 according to the present invention is illustrated. The deicing system 38 generally includes a number 1 deice subsubsystem 40 and a number 2 deice subsystem 42. Each subsubsystem 40, 42 includes a controller 44a, 44b such that the subsystems 40, 42 are redundant. The controllers 44a, 44b communicate with each other over a communication bus 45 such that each subsystem 40, 42 is continually interrogating each other to assure proper operation of each system. Should one subsubsystem 40, 42 or one component of the subsubsystem 40, 42 fail, the other subsystem 42, 40 will provide uninterrupted deicing system 38 operation. Preferably, each subsubsystem 40, 42 communicates with the electrothermal heating element system 30 such that operation of the deicing system 38 is uninterrupted irrespective of a failure. Furthermore, the subsubsystem 40, 42 are alternatively designated as a primary or secondary system such that each subsubsystem 40, 42 is regularly exercised. The subsubsystem 40, 42 may be alternatively designated as the primary or secondary system each time the deicing system 38 is initiated, each time the aircraft 100 is operated, or at some other interval. As the subsystems 40, 42 are identical, only subsubsystem 40 will be described in detail with the understanding that the description applies equally to subsystem 42.

The subsystem 40 generally includes the controller 44*a*, an air data computer 46*a*, an ice rate controller 48*a* and an ice rate probe 50*a*. The controller 44*a* communicates with a 200 VAC junction box 52 which communicates the electrical energy such as from the Engine Driven Generator $E_{gen}$ to drive the electrothermal heating element system 30 for the main rotor blade 10 and each tail rotor blade 34 through a main rotor slip ring 54 and tail rotor slip ring 56.

The air data computer 46*a* communicates flight and environment information to the controller 44*a*. Information such as airspeed outside air temperature (OAT) as well as other conditions are preferably provided. The air data computer 46*a* may be a dedicated controller for the deice system or may be information provided by other aircraft data systems.

The ice rate probe 50*a* operates in accordance with a reference signal provided by the ice rate controller 48*a* which communicates with the controller 44*a*. As ice accumulates on the probe, the detection frequency will change such that the controller 44*a* provides the aircrew with a visual display of icing conditions on a Multi-function Display 58 (MFD) or the like within the aircraft cockpit. The MFD 58 preferably provides information regarding the status control and communication with the blade deice system 38, however, other communication and control systems will also be usable with the present invention.

The controller 44*a* communicating a heating cycle 60 (FIG. 6) to the electrothermal heating element system 30 such that the electrical energy provided by the junction box 52 follows the heating cycle. That is, the junction box 52 distributes power to the electrothermal heating element system 30 in accordance with the heating cycle 60.

Figure 6:
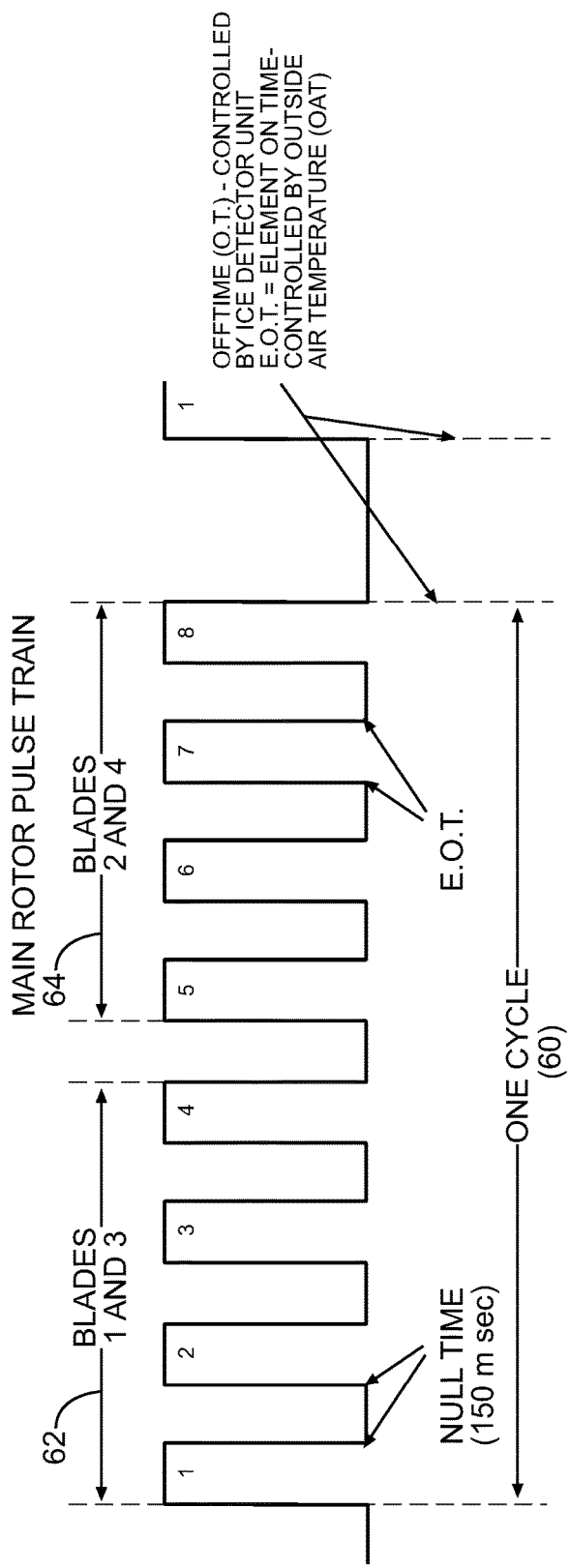
FIG. 6 is a graphical representation of one cycle in a pulse train for a main rotor blade as generated by the deice system of FIG. 5.

Referring to FIG. 6, the heating cycle 60 preferably defines a first electric pulse train 62 and a second electric pulse train 64 subsequent to the first electric pulse train 62. The first electric pulse train 62 is preferably associated with a first set of main rotor blades such as blades 1 and 3 of a four-bladed main rotor system while the second electric pulse train is associated with a second set of main rotor blades such as blades 2 and 4 of a four-bladed main rotor system. It should be understood that the number of pulse trains and the number of blades within each set may differ but will likewise be usable with the present invention.

Figure 7:
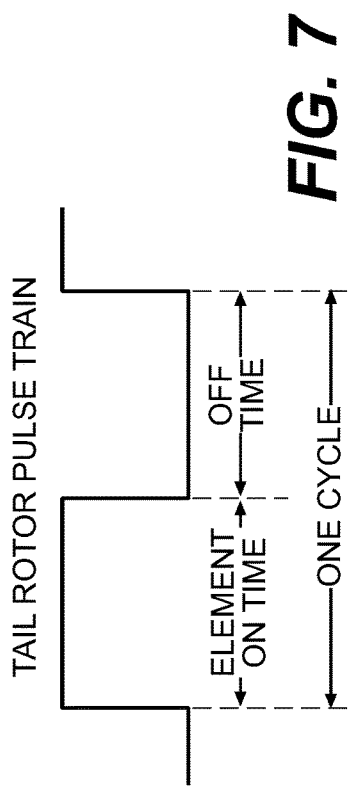
FIG. 7 is a graphical representation of one cycle in a pulse train for a tail rotor blade as generated by the deice system of FIG. 5.

The controller 44*a* sends command signals through the main rotor slip ring 54 to the redundant components of the hub distributor 66 (FIG. 5), which responds to controller signals by switching power in sequence to the main rotor blade heating elements 32-1, 32-2, 32-3, 32-4. The tail rotor blade power is switched directly by the controller 44*a* and sent through the tail rotor slip rings 54 to the tail rotor blades. A tail rotor blade distributor is not required since the power is applied to each of the tail rotor blades simultaneously (FIG. 7).

Each electric pulse train 62, 64 sequentially provides power to the heating elements 32-1, 32-2, 32-3, 32-4 in the designated blade set. The preferred sequential order being the third electrothermal heating element 32-3, the first electrothermal heating element 32-1, the second electrothermal heating element 32-2, then the fourth electrothermal heating element 32-4. Such sequence efficiently minimizes the likelihood of the melted ice refreezing as it flows along the blade chord by airflow.

Each electric pulse train 62, 64 is defined by a element on-time, a null time between the element on-time for this element and the next element, and an off-time between heating on-times between successive application of power to the first heating element 32-3. The null time is preferably a relatively short fixed value such as 200 milliseconds which accounts for electrical switching between heating elements 32-1, 32-2, 32-3, 32-4.

The element on-time is a linear function of outside air temperature (OAT) as determined by the air data computer 46*a*. Preferably, the element on-time corresponds to a linear function having an on time value of 19 seconds at an OAT=−30 degrees C. and a value of 1 second at temperatures between 0 degrees C. and +5 degrees C.

The off-time is the time between successive application of power to the first heating element 32-3. The sum of the on-time and the off-time defines a heating cycle 60. That is, activation of each of the heating elements for each of the blades and the time that heat is not applied to the blades defines one heating cycle. The off-time is preferably a non-linear function of liquid water content (LWC) in which the off-time is equal to 60 seconds/LWC.

Preferably, a voltage signal level is increased during the heating cycle 60 in a step-function like manner (FIG. 8) to provide a signal for activating each heating elements 32-1, 32-2, 32-3, 32-4 in the heating cycle 60. The increase in the voltage is the signal sent from the controller 44*a* and not the power to the heating element 32-1, 32-2, 32-3, 32-4. Preferably, there is one volt between heat application for each element, however, other voltage differences may also be used. Each of the eight signal voltage pulses is shown in FIG. 8.

Figure 8:
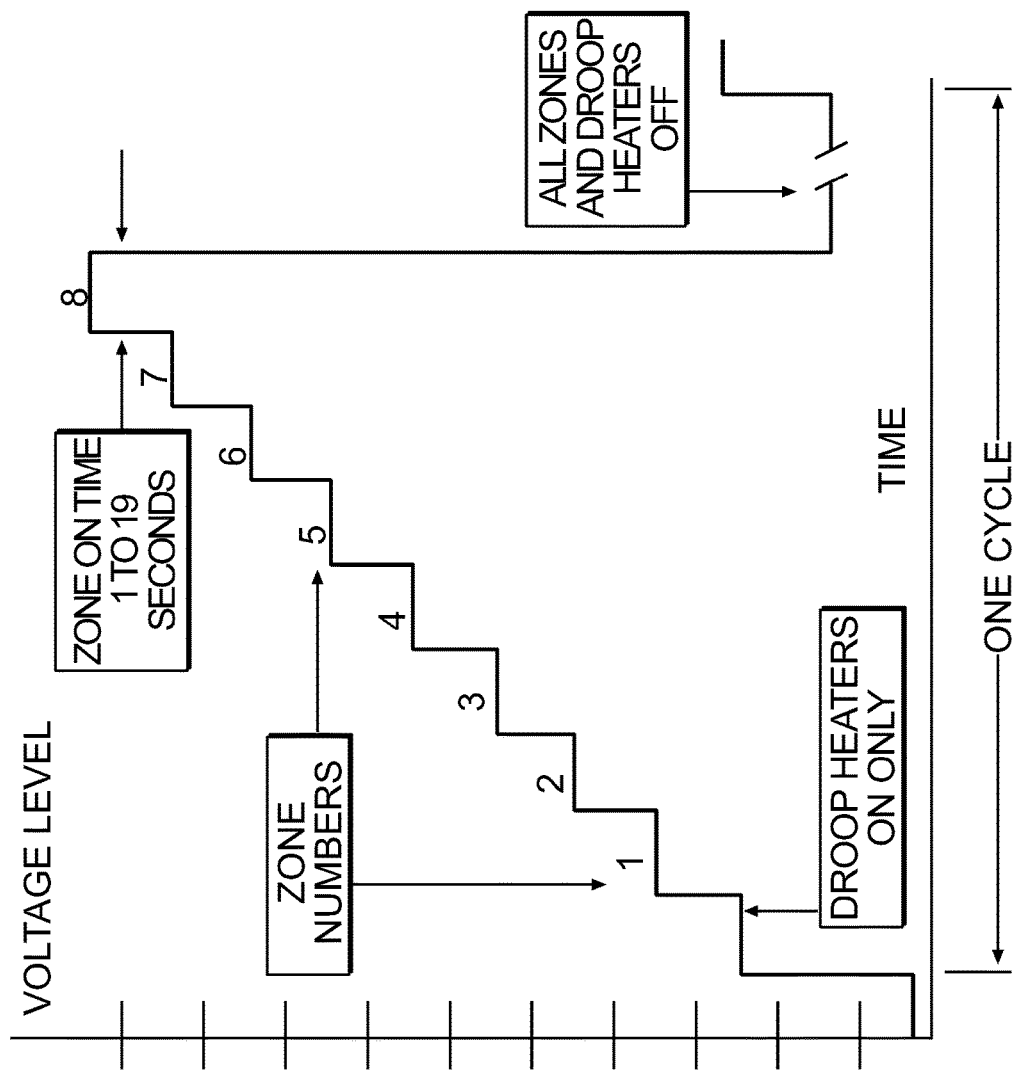
FIG. 8 is a graphical representation of one cycle in a pulse train for a main rotor blade as generated by the deice system illustrating an increase in the voltage level throughout the cycle.

If an element had failed, only seven signal voltage pulses would be illustrated in FIG. 8 and there would be a two volt shift between the application of power from one non-failed heating element 32-1, 32-2, 32-3, 32-4 to the application of the next non-failed heating element 32-1, 32-2, 32-3, 32-4. That is, the controller 44*a* skips the failed heating element. To determine a failed heater element, the controller 44*a* preferably provides a multiple of checks during transmission of the operation of the voltage signal level (FIG. 8) such as comparisons with a system clock, current in each power lead, confirmation that sent signals are received (the sent signal is repeated back to the controller 44*a*), etc. For example, if a heating element 32-1, 32-2, 32-3, 32-4 is above or below a predetermined target level by more than a predetermined amount, the heating element 32-1, 32-2, 32-3, 32-4 will be classified as failed. The controller 44*a* will then no longer set the voltage signal for the failed heating element at the level associated with that heater zone in the voltage signal level (FIG. 8), so the next zone in the sequence will be energized earlier than normal, in accordance with that signal voltage.

The tail rotor heating cycle (FIG. 7) is a more straightforward version of the main rotor heating cycle as each of the tail rotor blade heaters are activated simultaneously and there is only a single heating element on each tail rotor blade.

In operation, the blade deice system 38 utilizes the MFD 58 in conjunction with the controllers 44*a*, 44*b* to control and test the system. The MFD allows the flight crew to select automatic operation (AUTO) in response to the system determination that at least 0.015 of an inch ice has been detected or manual operation (TRACE, LIGHT, MODERATE, HEAVY) when the flight crew believes that the automatic mode has failed to provide effective deicing of the main rotor blades 10.

The MFD 58 preferably displays the icing severity as: TRACE, LIGHT, MODERATE and HEAVY. It should be understood that the icing severity levels TRACE; LIGHT; MODERATE; and HEAVY are predetermined values for each aircraft type. An ICE DETECTED caution is displayed on the MFD 58 when the electrothermal heating element system 30 is off but ice has been detected. The flight crew is thereby informed of the requirement to turn on the blade deice system 38.

When ICE DETECTED is displayed on the MFD, the flight crew must ensure that at least the following systems are ON prior to the warning being extinguished: No. 1 Eng Anti-Ice, No. 2 Eng Anti-Ice, Pitot Tube Heat (normally automatic), Blade Deice, Pilot Windshield Heat, and Copilot Windshield Heat.

The MFD preferably permits selection between automatic or manual control of blade heating element off time. In AUTO mode, the controllers 44a, 44b provide the signals that result in off-time variations proportional to the ice rate as described above. In a manual mode (TRACE; LIGHT; MODERATE; or HEAVY), the off-times are fixed.

When there is an ice rate subsystem malfunction, a FAIL indication on the MFD will appear advising that the deice system is using a default LWC and advising that operation of the blade deice system in one of the manual modes (TRACE; LIGHT; MODERATE; or HEAVY) made be required.

MANUAL mode is also preferably entered when the MFD has no indicated malfunction, but any of these three conditions has occurred:

(1) pilot has determined by his judgment of ice severity that ice rate system is inaccurate, (2) torque required has increased to an unacceptable level, or (3) helicopter vibration has increased to an unacceptable level.

It should be understood that relative positional terms such as "forward," "aft," "upper," "lower," "above," "below," and the like are with reference to the normal operational attitude of the vehicle and should not be considered otherwise limiting.

Although particular step sequences are shown, described, and claimed, it should be understood that steps may be performed in any order, separated or combined unless otherwise indicated and will still benefit from the present invention.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A method of deicing a rotary wing aircraft, comprising:
   providing a first electrothermal heating element located along a leading edge of a main rotor blade over a stagnation line, a second electrothermal heating element located aft of the first electrothermal heating element along an upper surface of the main rotor blade, a third electrothermal heating element located aft of the first electrothermal heating element along a lower surface of the main rotor blade, and a fourth electrothermal heating element located aft of the third electrothermal heating element along the lower surface of the main rotor blade;
   operating the third electrothermal heating element prior to the first electrothermal heating element, the first electrothermal heating element prior to the second electrothermal heating element, and the fourth electrothermal heating element subsequent to the second electrothermal heating element in response to a heating cycle defined by a controller, the heating cycle including an on-time and an off-time; and
   communicating between the controller and another controller, such that the another controller is operable to define the heating cycle upon a failure associated with the controller.

2. The method of claim 1, wherein the off time is defined between the fourth electrothermal heating element and a repetition of the heating cycle.

3. The method of claim 1, wherein the first, second, third, and fourth electrothermal heating elements provide spanwise coverage from a 20% blade radius position to a 92% blade radius position of the main rotor blade span.

4. The method of claim 3, wherein the first and the second electrothermal heating elements provide chordwise coverage of 10% of an upper surface of the main rotor blade chord.

5. The method of claim 3, wherein the first, the third and the fourth electrothermal heating elements provide chordwise coverage of 17% of a lower surface of the main rotor blade chord.

6. The method of claim 1, wherein the on-time is a function of outside air temperature (OAT).

7. The method of claim 1, wherein the off-time is a function of liquid water content (LWC).

8. The method of claim 1, wherein the off-time corresponds to 60 seconds/LWC.

9. The method of claim 1, wherein the on-time is a linear function of outside air temperature.

10. The method of claim 1, wherein the off-time corresponds to 60 seconds/LWC and the on-time is a linear function of outside air temperature.

11. A method of deicing a rotary wing aircraft, comprising:
    operating a plurality of electrothermal heating elements in response to a heating cycle defined by a controller, the heating cycle including an on-time and an off-time for each of the plurality of electrothermal heating elements, the off-time a function of liquid water content (LWC);
    wherein the plurality of electrothermal heating elements comprise a first electrothermal heating element located along a leading edge of the main rotor blade over a stagnation line, a second electrothermal heating element located aft of the first electrothermal heating element along an upper surface of the main rotor blade, a third electrothermal heating element located aft of the first electrothermal heating element along a lower surface of the main rotor blade, and a fourth electrothermal heating element located aft of the third electrothermal heating element along the lower surface of the main rotor blade; and
    wherein the operating further comprising operating the third electrothermal heating element prior to the first electrothermal heating element, the first electrothermal heating element prior to the second electrothermal heating element, and the fourth electrothermal heating element subsequent to the second electrothermal heating element in response to the heating cycle defined by the controller.

12. The method of claim 11, wherein the controller is in communication with the first electrothermal heating element, the second electrothermal heating element and the third electrothermal heating element.

13. The method of claim 11, wherein the on-time is a function of outside air temperature (OAT).

14. A method of deicing a rotary wing aircraft, comprising:
activating a plurality of electrothermal heating elements of an electrothermal heating element system in a sequential order in response to a heating cycle defined by a controller, the plurality of electrothermal heating elements including a first electrothermal heating element located along a leading edge of a main rotor blade, a second electrothermal heating element located aft of the first electrothermal heating element along an upper surface of the main rotor blade, a third electrothermal heating element located aft of the first electrothermal heating element along a lower surface of the main rotor blade, and a fourth electrothermal heating element located aft of the third electrothermal heating element along the lower surface of the main rotor blade, the sequential order being the third electrothermal heating element, the first electrothermal heating element, the second electrothermal heating element, then the fourth electrothermal heating element; and
communicating between the controller and another controller, such that the another controller is operable to define the heating cycle upon a failure associated with the controller.

15. The method of claim 14, wherein the activating is in response to the heating cycle communicated to the electrothermal heating element system, the heating cycle defining a first electric pulse train associated with a first set of main rotor blades, and further comprising repeating the heating cycle after an off-time.

16. The method of claim 15, further comprising determining the off-time in accordance with a non-linear function of liquid water content (LWC).

17. The method of claim 15, further comprising communicating a second electric pulse train subsequent to the first electric pulse train, the first electric pulse train associated with the first set of main rotor blades and the second electric pulse train associated with a second set of main rotor blades.

18. The method of claim 15, further comprising determining an element on-time for the first pulse train, the heater element on-time being a linear function related to outside air temperature (OAT).

* * * * *